US011447395B2

United States Patent
Mohamed et al.

(10) Patent No.: US 11,447,395 B2
(45) Date of Patent: Sep. 20, 2022

(54) METHOD OF PRODUCING SODIUM BENTONITE

(71) Applicant: King Fahd University of Petroleum and Minerals, Dhahran (SA)

(72) Inventors: Abdelmjeed Mohamed, Dhahran (SA); Mohamed Mahmoud, Dhahran (SA); Salaheldin Elkatatny, Dhahran (SA); Abdullah Sultan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 360 days.

(21) Appl. No.: 16/146,141

(22) Filed: Sep. 28, 2018

(65) Prior Publication Data

US 2020/0102226 A1    Apr. 2, 2020

(51) Int. Cl.
*C01B 33/40* (2006.01)
*C01B 33/44* (2006.01)

(52) U.S. Cl.
CPC .............. *C01B 33/40* (2013.01); *C01B 33/44* (2013.01); *C01P 2006/22* (2013.01)

(58) Field of Classification Search
CPC .. B28C 1/04; B28C 1/08; B28C 1/003; C01B 33/40; C01B 33/26; C09K 2208/34; C09K 8/032; C09K 23/00; B01F 17/0028
See application file for complete search history.

(56) References Cited

U.S. PATENT DOCUMENTS

| 4,500,436 A | 2/1985 | Pabley |
| 9,676,669 B1 * | 6/2017 | Magzoub ................ C04B 33/04 |
| 10,081,574 B2 * | 9/2018 | Magzoub ............... C09K 8/032 |

FOREIGN PATENT DOCUMENTS

| CN | 102079972 B | 11/2012 |
| CN | 104030308 A | 9/2014 |
| CN | 105542731 A | 5/2016 |
| CN | 107418530 A | 12/2017 |
| CN | 107573910 A | 1/2018 |
| WO | 92/05123 | 4/1992 |

OTHER PUBLICATIONS

S. Kaufhold, et al., "Comparison of methods for distinguishing sodium carbonate activated from natural sodium bentonites", Applied Clay Science, vol. 86, Dec. 2013, pp. 23-37.

* cited by examiner

*Primary Examiner* — Shuangyi Abu Ali
(74) *Attorney, Agent, or Firm* — Oblon, McClelland, Maier & Neustadt, L.L.P.

(57) ABSTRACT

Method of converting calcium bentonite to sodium bentonite that is suitable for use as drilling mud or a cement additive. The method comprises preparing a suspension comprising sea water and calcium bentonite at a pH in the range of 8-11, and continuously heating and stirring the suspension for a time in the range of 12 hours to 36 hours. Additives such as soda ash and sodium salt of ethylenediamineteraraacetc acid (EDTA) may be added to the suspension to improve the properties of the product sodium bentonite.

16 Claims, 9 Drawing Sheets

Figure 2A
Figure 2B
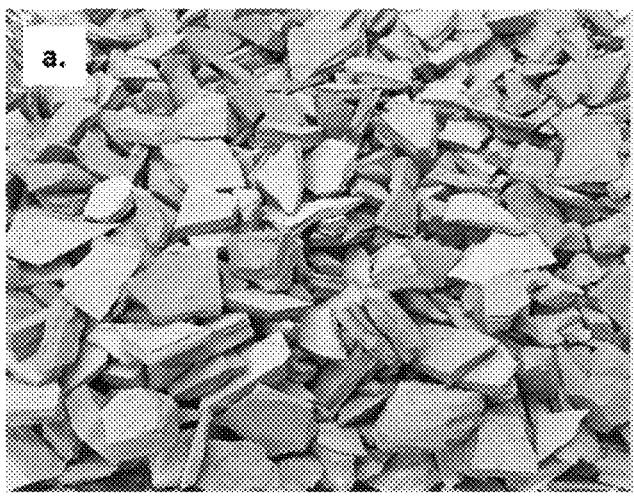
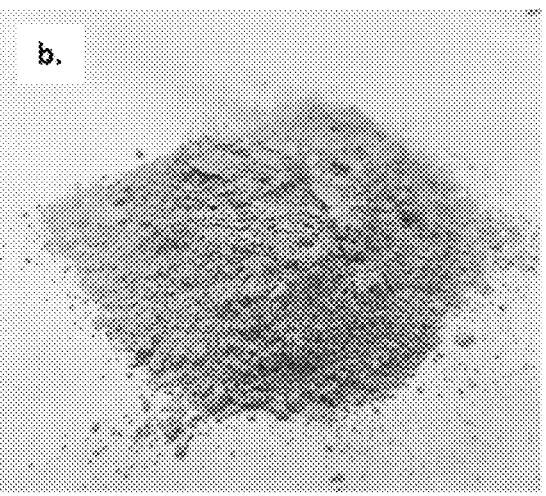

METHOD OF PRODUCING SODIUM BENTONITE

BACKGROUND OF THE INVENTION

Technical Field

The present invention relates to a method of preparing sodium bentonite. In one aspect, calcium bentonite is converted into sodium bentonite by a combination of chemical, thermal and mechanical treatment procedures. The produced sodium bentonite is suitable for but not limited to oil and gas drilling and cementing applications.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids play an important role in drilling operations. They are circulated during drilling to carry out and transport the cuttings produced by the drill bit to the surface, and to cool and lubricate the drilling bit, as well as suspending the drilling cuttings during pauses in the drilling operation. Also, they apply hydrostatic pressure on a geological formation to counter the formation pressure and prevent formation fluids from entering the well bore [Bourgoyne Jr. et al. (1986). Applied Drilling Engineering. Soc Pet Eng 2:514; and Hossain et al. (2015), Fundamentals of Sustainable Drilling Engineering, John Wiley & Sons]. Consequently, drilling fluid interacts with the formation to permanently or temporarily alter the pressure or permeability characteristics of the formation leading to a change in well productivity. Fluid loss control additives are added to the drilling fluid to minimize fluid filtrates and solid particle invasion and to reduce damage to the formation. There are many types of fluid loss control additives used in the oil industry such as polymers, clays, lime, starch, and bridging agents such as calcium carbonate [Caenn et al. (2011) Composition and Properties of Drilling and Completion Fluids, six. ed, Composition and Properties of Drilling and Completion Fluids. Elsevier]. To achieve the desired functions, the rheological properties of the drilling fluids are maintained during the drilling operations by selecting and adding appropriate additives to the drilling fluids. Additives such as polymers and clays may be used to change properties of the drilling fluid such as density, viscosity, gel strength, filtration, and pH.

Bentonite is a natural clay containing primarily montmorillonite minerals that are usually formed from weathering of volcanic ash in the presence of water. There are different types of bentonite, each named after the dominant element, such as potassium (K), sodium (Na), calcium (Ca), magnesium (Mg) and aluminum (Al). Na-bentonite expands up to 15 times its volume when wet, and is capable of absorbing an amount of water that is several times its dry mass. Compared to other types of bentonite, Na-bentonite has superior colloidal and absorbent properties which have helped to popularize its use in drilling mud or drilling fluid for oil and gas wells and for treating boreholes for geotechnical and environmental investigations. Na-bentonite is used as a viscofier or lubricant and in water control to reduce filtration loss. Including Na-bentonite in a drilling fluid helps to cool cutting tools, to remove the soil and rock cuttings, to support the borehole and to prevent the borehole from collapsing through the formation of a mud cake. Most high-grade natural Na-bentonite in the United States, which is the world's largest bentonite producer, is produced from the western part of the country in an area between the Black Hills of South Dakota and the Bighorn Basin of Wyoming. In addition to drilling fluid applications, Na-bentonite is also useful as a sealant, providing a self-sealing, low permeability barrier, for example, at the base of landfills.

Bentonite has been used as a drilling fluid additive to maintain the rheological properties of drilling fluid and to enhance the filtration performance thereby minimizing fluid loss into the formation and prevent formation damage [Darley et al. (1988). Composition and Properties of Drilling and Completion Fluids. Gulf Professional Publishing; Lebedenko et al. (1988) Some Considerations on the Aging of $Na_2CO_3$ Activated Bentonites. Applied Clay Science, Vol. 3(1), pp. 1-10; Al-Homadhi E. S. (2007) Improving Local Bentonite Performance for Drilling Fluids Applications. Paper No. SPE 110951, presented at the SPE Saudi Arabia Section Technical Symposium, Dhahran, May 7-8; Falode et al. (2008) Evaluation of Local Bentonite Clay as Oil Well Drilling Fluids in Nigeria. Applied Clay Science, Vol. 39(1): p. 19-27; Musaab et al. (2017) Effects of Sodium Carbonate Addition, Heat and Agitation on Swelling and Rheological Behavior of Ca-Bentonite Colloidal Dispersions. Applied Clay Science 147, pp. 176-83; and U.S. Pat. No. 9,676,669 (Musaab et al.)]. Bentonite is also used as weighting material when drilling the upper sections of oil and gas wells. In addition, bentonite clay is used in cementing oil and gas wells. It is mixed with cement slurry as physical extender to cement weak formations to prevent fractures and reduce fluid loss into the formation [Michaux et al. (1989) Cement Chemistry and Additives. Oilf. Rev., Vol. 1(1): p. 18-25]. The American Petroleum Institute (API) has established specifications for drilling grade bentonite which are shown below in Table 1.

TABLE 1

| API 13A Specification for Drilling Grade Bentonite | |
|---|---|
| Property | Specified Limits |
| Viscometer dial reading at 600 rpm | Minimum 30 |
| Yield point to plastic viscosity ratio | Maximum 3 |
| Filtration volume at 30 min | Maximum 15 $cm^3$ |
| Residue after sieved with 200 mesh (75 μm) | Maximum 4.0% by weight >75 μm |
| Moisture | Maximum 10.0% by weight |

Generally, there are three main classes of industrial bentonites: sodium, calcium, and artificial sodium activated bentonite [Ahmed et al. (2012) Studies on the Mineral and Chemical Characteristics of Pindiga Bentonitic Clay. Petroleum Technology Development Journal, Vol. 1 (1595-9104), pp. 1-8, January]. In drilling fluids, sodium bentonite is preferred over calcium bentonite because calcium bentonite has poor swelling and dispersion properties [Hassan and Abdel-Khalek, 1998; Dill, 2016; Yan et al., 2016]

Raw natural bentonite without treatment may not be adequate for use as a drilling fluid additive even when it is rich in montmorillonite and/or contains a sufficient amount of sodium. Untreated natural bentonite may not have the appropriate properties to provide the desired function [Bol G. (1986) Bentonite Quality and Quality-Evaluation Methods. SPE Drilling Engineering, Vol. 1(04): p. 288-96.].

Bentonite performance and properties can be improved by several methods and by the inclusion of inorganic additives. Addition of soda ash (sodium carbonate) is well-known process to increase bentonite quality [Karagüzel et al. (2010) Activation of (Na, Ca)-bentonites with Soda and MgO and Their Utilization as Drilling Mud. Applied Clay Science Vol. 48(3), pp. 398-404. April]. Addition of only 2 to 4 wt. % weight can significantly enhance bentonite properties. Sodium content greatly affects the dispersion characteristics of bentonite.

Na/Ca ratio affects physical properties of bentonite [Lebedenko et al. (1988) Some Considerations on the Aging of $Na_2CO_3$ Activated Bentonites. Applied Clay Science, Vol. 3(1), pp. 1-10]. Ca-bentonite is found abundantly in many parts of the world including the southern part of the United States such as Mississippi and Alabama, and in Saudi Arabia. It has a good absorbent properties, but it is only capable of swelling 2-3 times of its unwetted volume. Researchers and bentonite producers have attempted to utilize local sources of bentonite. Several methods have been developed to purify or treat raw bentonite, such as dry-sieving, wet-sieving, dispersing in hexametaphosphate solutions, sedimentation and mixing with soda ash, but the methods have been found to be time-consuming or have low efficacy.

Al-Homadhi et al. attempt to treat local bentonite with soda ash, extenders and/or additives such as salt and polymers. The final modified bentonite did not satisfy API specifications for evaluation of drilling mud [Al-Homadhi, E. S. "Improving Local Bentonite Performance for Drilling Fluids Applications", Society of Petroleum Engineers Saudi Arabia Section Technical Symposium, 7-8 May 2007, Dhahran Saudi Arabia—incorporated herein by reference in its entirety].

In Australian Pat. No. AU566345B (incorporated herein by reference in its entirety), magnesium- and/or calcium-containing bentonite are agglomerated by soda ash treatment to produce Na-bentonite for laundry applications. The produced Na-bentonite has not been evaluated for drilling fluid applications.

Chinese Pat. No. CN1061946C (incorporated herein by reference in its entirety) describes a process of producing Na-bentonite from Ca-bentonite by soda ash treatment followed by ion exchange reaction. The produced Na-bentonite also has not been evaluated for drilling fluid applications.

Yildiz et al. activate local Ca-bentonite with soda ash to increase the Na/Ca ratio and disperse the activated bentonite in sodium hexametaphosphate solutions to increase the stability of the suspension. The rheological properties of the activated bentonite were tested at different sodium hexametaphosphate and NaCl concentrations but did not meet the API standards for drilling fluids [Yildiz et al. "The effect of the electrolyte concentration and pH on the rheological properties of the original and the $Na_2CO_3$-activated Kutahya bentonite" Applied Clay Science 14(5-6):319-327 (1999)—incorporated herein by reference in its entirety].

Kaufhold et al. activate Mg/Ca-bentonite with sodium carbonate in both dry state and in solution with excessive water with no heating. They conclude that despite the addition of the sodium carbonate in excess (1-5 wt. %), the activation process may be incomplete and partial whether it is conducted in a dry state or a wet state [Kaufhold et al. "Comparison of methods for distinguishing sodium carbonate activated from natural sodium bentonites" Applied Clay Science 86:23-37 (2013)—incorporated herein by reference in its entirety].

Karagüzel et al. activate local bentonite with 1.5-3 wt. % soda ash and 0.5% MgO without heating or a prior purification step. The combination of soda ash and MgO was found to influence the viscosities, swelling indices and filtration losses to produce an activated bentonite that satisfies drilling mud standards {Karagüzel et al. "Activation of Na, Ca)-bentonites with soda and MgO and their utilization as drilling mud—incorporated herein by reference in its entirety].

Magzoub et al. (2017) and U.S. Pat. No. 9,676,669—both incorporated herein by reference in their entirety—developed a method for producing sodium bentonite from Saudi local calcium bentonite by heating and stirring a suspension of bentonite in soda ash solution for 24 hours. The method is effective in enhancing the rheological and filtration properties of local bentonite. However, this method requires fresh water which adds significant cost to the process, in particular, in arid environment.

Therefore, one object of the present disclosure is to describe a process for producing sodium bentonite by treating calcium bentonite using seawater that eliminates the use of fresh water and reduces the amount of soda ash required for the treatment.

BRIEF SUMMARY OF THE INVENTION

In one aspect, there is provided a method of converting calcium bentonite to sodium bentonite having a Na/Ca molar ratio of at least 2.5. The method comprises mixing calcium bentonite with sea water at final bentonite concentration in the range of 2 wt. % to 15 wt. % of the total weight of the sea water to form a bentonite suspension, adjusting the pH of the suspension in the range of 8.0 to 11.0, and heating to a temperature in the range of 80 to 100° C. and stirring the suspension for a time in the range of 12 to 72 hours to form sodium bentonite and calcium carbonate. Finally the sodium bentonite is filtered and oven dried.

In a preferred embodiment, the sea water is from the Red Sea, the Arabian Gulf, Mediterranean Sea, or a brine outflow from sea water desalination plant.

In another preferred embodiment, the sea water contains at least 12,000 ppm sodium.

In another preferred embodiment, sodium carbonate is added to the suspension,

In another preferred embodiment, the method further comprising stirring the suspension for a time in the range of 10 to 30 minutes prior to add the soda ash.

In another preferred embodiment, the ratio of soda ash/calcium bentonite is in the range of 1:11 to 1:45.

In a more preferred embodiment, the ratio of sodium carbonate/calcium bentonite weight ratio is in the range of 1:15 to 1:23.

In another preferred embodiment, the pH of the suspension is in the range of 8.0 to 11.0.

In a more preferred embodiment, the pH is in the range of 9.0 to 10.0.

In another preferred embodiment, the suspension is heated to about 100° C.

In another preferred embodiment, the suspension is heated continuously for 24 hours.

In another preferred embodiment, the suspension is stirred at a rate in the range of 300 to 600 RPM.

In another preferred embodiment, sodium hydroxide and/or ethylenediaminete-tracetate (EDTA) is added.

In another preferred embodiment, the Ca-bentonite has been purified by at least one method selected from the group consisting of dry-sieving, wet-sieving, dispersion in deionized water with hexametaphosphate, dispersion in deionized water without hexametaphosphate and sedimentation.

In another preferred embodiment of the method, the product sodium bentonite has an apparent viscosity of at least 15 cP.

In another preferred embodiment of the method, the product sodium bentonite has a yield point of no more than 30 lb/100 ft$^2$.

In another preferred embodiment of the method, the product sodium bentonite has a viscometer dial reading of 33-35 lb/100 ft$^2$ at 300 rpm and 39-40 lb/100 ft$^2$ at 600 rpm.

In another preferred embodiment of the method, the product sodium bentonite has a total filtrate volume in the range of 12 to 15 mL.

A second aspect of the invention is directed to a method of preparing drilling fluids comprising sodium bentonite having a Na/Ca molar ratio of at least 2.5 comprising:

mixing calcium bentonite with sea water to form a suspension at final bentonite concentration in the range of 2 wt. % to 15 wt. % of the total weight of the sea water, adjusting the pH of the suspension in the range of 8.0 to 11, heating the suspension to a temperature in the range of 80 to 100° C. with stirring for a time in the range of 12 to 72 hours, filtering and oven drying the product sodium bentonite, and mixing the sodium bentonite with water in an amount in the range of 1 wt. % to 10 wt. %.

In a preferred embodiment, the method further comprising mixing one or more additive selected from the group consisting of an antiscalant, a thickener, a deflocculant, a lubricant, a buffer, a biocide, and a weighting agent.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A shows a sample of chips bentonite from Khulais area.

FIG. 2B shows a sample of powdered bentonite from Khulais area.

DETAILED DESCRIPTION OF THE EMBODIMENTS

Figure 1A:
FIG. 1A is a map of the Red Sea, Arabian Gulf, and surrounding countries. In set is a world map showing the location of the expanded area.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

As used herein, the terms "soda ash" and "sodium carbonate" have the same meaning and used interchangeably referring to a chemical compound having the formula $Na_2CO_3$.

As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

U.S. Pat. No. 9,676,669—incorporated herein by reference in its entirety discloses a method for producing sodium bentonite from local Saudi calcium bentonite by adding sodium carbonate to the bentonite suspension in purified water under heating and stirring for 24 hours. The method was proven effective in enhancing the rheological and filtration properties of local Ca-bentonite, but the use of fresh purified water, in particular, in an arid environment can be expensive. The instant invention utilizes abundant cheap sea water instead of purified water. Surprisingly, the use of sea water produces bentonite having similar rheological and filtration properties without the need of any sodium carbonate when sea water from the Arabian Gulf is used. In other instances, only about half of the sodium carbonate previously used is needed when other sea water is used.

The present invention pertains to a method of converting or upgrading calcium (Ca) bentonite to sodium (Na) bentonite. Advantageously, the produced Na-bentonite is of drilling mud grade, satisfying the specifications and standards that are set forth in the American Petroleum Institute (API) Recommended Practice 13B-1 for Field Testing Water-Based Drilling Fluids (incorporated herein by reference in its entirety), which are listed in part in Table 1.

In one aspect the method of the invention comprises mixing sea water with Ca-bentonite to form a suspension, and heating the suspension. The Ca-bentonite is mixed with (preferably added to) the sea water to form a suspension having a final bentonite concentration in the range of 2 wt. % to 15 wt. % of the total weight of the sea water, preferably in the range of 4 wt. % to 10 wt. %, 5 wt. % to 8 wt. %, more preferably 6 wt. % to 7 wt. %.

In a preferred embodiment, sodium carbonate is added to the suspension. The amount of sodium carbonate added is dependent on the sodium content of the sea water. The higher the sodium content of the sea water, the less sodium carbonate is needed to achieve the desired results. For example, when sea water from the Arabian Gulf or sea water (brine) outflow from a desalination plant is used (which may contain about 20,000 ppm or more sodium), sodium carbonate may not be needed. In another instance, the ratio of sodium carbonate to Ca-bentonite by weight is in the range of 0.1:10 to 1:45, preferably 0.2:12 to 1:30, more preferably 0.4:15 to 1:23. In a particularly, preferred embodiment the ratio sodium carbonate to Ca-bentonite is about 1:23.

As used herein the term "sea water" is meant to be any sea water or processed sea water such as a brine effluent from a desalination plant or seawater from any salty body of water such as but not limited to any sea or ocean including the Red Sea, the Arabian Gulf, Mediterranean Sea, the Dead Sea, the Black Sea, the Gulf of Mexico, the Atlantic Ocean, the Pacific Ocean, the Indian Ocean, and/or the brine outflow of sea water desalination plants using any of the aforementioned seawaters. In particular, the sea water preferably has a salt content in the range of 3% to 4.2% by weight, more preferably 3.4% to 4.1% by weight, and most preferably >3.8% by weight. In particular, sea water has sodium in the range of 10,000 to 22,000 ppm (10 mg/L to 22 mg/L), preferably, in the range of 12,000 to 21,000 ppm (12 mg/L to 21 mg/L), and more preferably in the range of 14,000 to 20,000 ppm (14 mg/L to 20 mg/L).

As used herein the phrase "sodium bentonite" means that the sodium/calcium ratio of the bentonite is greater than 1. In a preferred embodiment, the Na-bentonite has a Na/Ca molar ratio of at least 2.5, preferably in the range of 2.5-3.0, more preferably in the range 2.7-3.0, and most preferably in the range of 2.8-3.0.

Sea water is one of the most abundant natural resource on earth. It is found close to many geographical locations, in particular, where petroleum and natural gas fields are found such as in Texas, Alaska, North Africa, the North Sea, and the Middle East. It contains on the average 3.5 wt. % salts, primarily sodium chloride. The salinity of sea water may vary somewhat due to several environmental factors including temperature, average rain fall, and proximity to fresh water sources such as rivers and melting ice. For example, the salinity of the Atlantic Ocean is much higher in the equatorial regions than that of the Polar Regions. In the polar regions of the North Atlantic Ocean, there is significant rain fall combined with low temperature and arctic ice melts causing lower salinity. In contrast, the equatorial regions of the Atlantic Ocean have very little rain fall combined with relatively high temperature contributing to high evaporation rate causing increased salinity. In addition to the predominant sodium ions (0.469 mol/kg) and chloride ions (0.546 mol/kg), average salinity sea water contains significant amount of other inorganic ions including magnesium ions (0.0528 mol/kg), sulfate ions (0.0282 mol/kg), calcium ions (0.0103 mol/kg), potassium ions (0.0102 mol/kg) and smaller amount of other ions such as strontium(II), hydrated boron carbonate, bicarbonate, and hydroxide ion. A detailed composition of sea water can be found in the Department of Energy publication (1994) A. G. Dickson and C. Goyet, Ed. "Handbook of methods for analysis of the various parameters of the carbon dioxide system in sea water" and available on line at https://www.nodc.noaa.gov/ocads/oceans/handbook.html, incorporated herein in its entirety by reference.

In a preferred the embodiment, the water used in the method of the present disclosure is from the Red Sea. The Red Sea (also the Erythraean Sea) is a seawater inlet of the Indian Ocean, lying between Africa and Asia. The connection to the ocean is in the south through Bab el Mandeb strait and the Gulf of Aden. To the north lie the Sinai Peninsula, the Gulf of Aqaba, and the Gulf of Suez leading to the Suez Canal. The Red Sea is located between arid land, desert, and semi-desert. The Red Sea water mass-exchanges its water only with the Arabian Sea and Indian Ocean via the Gulf of Aden. These geographical factors reduce the effect of high salinity caused by evaporation in the north and relatively hot water in the south. The Red Sea is one of the saltiest bodies of water in the world, owing to high evaporation. Salinity ranges from between ~3.6% in the southern part because of the effect of the Gulf of Aden water and 4.1% in the northern part, owing mainly to the Gulf of Suez water and the high evaporation rate. The average salinity is 4.0%. The salinity of the Red Sea is greater than the world average, by approximately 4 percent due to high rate of evaporation, very little precipitation, lack of significant rivers or streams draining into the sea, and the limited connection with the Indian Ocean, which has lower water salinity.

In another preferred embodiment, the water used in the method is from the Arabian Gulf which refers to a body of water between the Arabian Peninsula and Iran and open to the Arabian Sea and the Indian Ocean through the Gulf of Aden in the south. Similar to the Red Sea, the Arabian Gulf has limited connection to the Indian Ocean in a warm environment. The Arabian Gulf is connected to the Indian Ocean through Strait of Hormuz. The evaporation rate of the sea is high, so that after considering river discharge and rain contributions, there is still a deficit leading to increase salinity of the water. The water from the Arabian Gulf has a higher salinity and denser than that of the ocean, and therefore it exits from the bottom of the strait, while ocean water with less salinity flows in through the surface.

Similar to the Red Sea and the Arabian Gulf, the Mediterranean Sea is also nearly landlocked body of water located in warm environment between North Africa and Southern Europe. It is connected to the Atlantic Ocean only through the Strait of Gibraltar. The rate of water evaporation greatly exceeds precipitation and river runoff in the Mediterranean, a fact that is central to the water circulation within the basin. Evaporation is especially high in its eastern half, causing the salinity to increase eastward. The salinity at 5 meter depth is 3.8%.

Another source of the sea water of the invention is the brine outflow (effluent) of water from sea water desalination plants. The brine outflow is a concentrated salt solution of mostly sodium chloride in sea water.

Desalination of sea water is a process used to produce fresh water from sea water for human and agricultural use. Due to its energy consumption, desalinated sea water is generally more costly than fresh water obtained from natural sources such as from rivers or groundwater, and/or from water recycling or water conservation. However, these alternatives are not always available and depletion of underground fresh water reserves is a critical problem worldwide. Currently, approximately 1% of the world's population is dependent on desalinated water to meet daily needs, but the UN expects that 14% of the world's population will encounter water scarcity by 2025. Desalination is particularly relevant in dry countries including, but not limited to, Australia, the Kingdom of Saudi Arabia, and Kuwait. According to the International Desalination Association, in June 2015, 18,426 desalination plants operated worldwide, producing 86.8 million cubic meters per day, providing water for 300 million people. This number increased from 78.4 million cubic meters in 2013, a 10.71% increase in 2 years. The single largest desalination project is Ras Al-Khair in Saudi Arabia, which produced 1,025,000 cubic meters per day in 2014. Kuwait produces a higher proportion of its water than any other country, totaling 100% of its water use.

Desalination plants produce large quantities of brine outflow which contain substantial amounts of sodium chloride. High sodium chloride content makes brine outflow an ideal candidate for use in the method of the invention, and provides a useful application for an otherwise disposable byproduct. In addition, the use of the outflow from sea water desalination plant in the method may eliminate the need to use sodium carbonate in the method thereby further lowering the cost of production of sodium bentonite. The salt concentration in the brine out flow varies with the desalination method used. Reverse osmosis desalination plants generally produce brine with higher salt content than that of thermal desalination plants. A comparison between the chemical characteristics of the sea water feed and the brine out flow water from several water desalination plants in the Arabian Gulf reproduced herein from Alameddin et al. [Desalination 214 (2007) 241-260] is shown below:

larly preferred purified Ca-bentonite has a zeta potential charge of −40 to −20 mV across a pH range of 3 to 12, when it is in a colloidal dispersion.

The heating and stirring may increase bentonite platelet or particle size, expand the bentonite platelets for enhanced swelling and ion exchange, penetrate and invade bentonite layers with water, move sodium ions to the surface of the bentonite layers allowing enhanced $Na^+$ activation and swelling, increase the Na/Ca ratio, and lead to changes in rheological properties such as, but not limited to, apparent viscosity, plastic viscosity, and yield point. Continuous heating and stirring are especially advantageous in supplementing soda ash activation when the latter alone does not suffice to produce drilling mud grade bentonite that meets the API requirements.

The heating temperature is maintained preferably in the range of 60° C. to 100° C., more preferably 80° C. to 100° C., most preferably 90° C. to 100° C. In a particularly, preferred embodiment, the temperature is maintained at about 100° C. The volume of the suspension should be maintained constant during the heating time by adding sea water to compensate for the water loss due to evaporation.

Any stirring or mixing method may be used in the method. Efficient stirring can be achieved by mechanical or

| Ion | Um-Alnar Plant[a] | | Taweela A Plant[a] | | Dbu Dhabi Plant[a] | | Doha West Plan[a] | |
|---|---|---|---|---|---|---|---|---|
| | Sea Water Intake | Brine Outflow | Sea Water Intake | Brine Outflow | Sea Water Intake | Brine Outflow | Sea Water Intake | Brine Outflow |
| Magnesium (mg/mL) | 1,612 | 3,625 | 1,655 | 3,500 | 1,821 | 3,606 | NR | NR |
| Sodium (mg/mL) | 11,806 | 21,750 | 13,250 | 26,142 | 12,103 | 22,437 | NR | NR |
| Potassium (mg/mL) | 574 | 870 | 610 | 830 | 542 | 845 | NR | NR |
| Calcium (mg/mL) | 516 | 1,850 | 659 | 1,775 | 563 | 1,818 | NR | NR |
| Iron (ppm) | NR | NR | NR | NR | NR | NR | 19.0 | 25.0 |
| Copper (ppm) | NR | NR | NR | NR | NR | NR | 4.3 | 8.0 |
| Chloride (mg/mL) | 26,921 | 37,223 | 28,113 | 38,821 | 27,1354 | 37,779 | 25,134 | 41,748 |
| Sulfate (mg/mL) | 3,723 | 4560 | 3,227 | 4,319 | 3,115 | 4,321 | NR | NR |
| Bicarbonate (mg/mL) | 115 | 190 | 131 | 187 | 126 | 185 | NR | NR |

[a]Abu Qdais Environmental impacts of desalination plants on the Arabian Gulf. Proc. International Desalination Association World Congress on Desalination and Water Reuse, Vol. 3, San Diego, 1999, pp. 249-260.

In addition to the major constituency listed in the Table above, the brine outflow usually contains corrosion products, halogenated organic compounds, oxygen scavengers, various acids, and a combination of anti-scaling/fouling/foaming/corrosion additives at relatively low levels depending on the desalination process involved.

Ca-bentonite used in the method may be raw, unpurified bentonite that has been dried to remove water. It may have moisture content by weight no more than 10%, preferably in the range of 0.5% to 10%, more preferably 1-8%, even more preferably in the range of 1% to 5% Alternatively, a purified Ca-bentonite by well-known methods in the art may be used. Such purification methods include, but are not limited to, dry-sieving, wet-sieving, dispersing in deionized water with or without hexametaphosphate, sedimentation and combinations thereof. Sieves used in dry- or wet-sieving have U.S. sieve or mesh sizes ranging from 100 to 400 mesh, such as 100, 115, 150, 170, 200, 250, 270, 325 and 400. A particumagnetic stirrer. The stirring rotational speed may be optionally maintained in the range 300 RPM to 600 RPM, preferably 350 RPM to 500 RPM, more preferably 400 RPM to 450 RPM. The stirring may be accompanied by ultrasound agitation and/or shaking to enhance homogeneity of the suspension.

Continuous heating and stirring of the suspension is essential to the method to achieve the desired rheological properties. The bentonite suspension is continuously heated and stirred for a time in the range of 3 to 48 hours, preferably in the range 12 to 36 hours, more preferably 15 to 30 hours, and most preferably 20-24 hours. In a particularly preferred embodiment, the suspension is heated and stirred for 24 hours.

The method of the invention produces Na-bentonite having a Na/Ca molar ratio of at least 2.5, preferably in the range of 2.5-3.0, more preferably in the range 2.7-3.0, and most preferably in the range of 2.8-3.0. The method is effective in increasing the Na/Ca ratio of a treated bentonite sample by at least 50%, at least 60%, at least 100% at least 150%, or at least 200%. The average particle size (diameter) can be increased by more than 500 times, preferably more than 800 times, more than 1000 time or more than 1500 times, for example, from ~2.5 μm to 1000-1500 μm, preferably 1100-1400 μm, more preferably 1200-1300 μm, with more than 90% of the particles being in the average particle size range (1000-1500 μm). Without the continuous heating and stirring, soda ash activation alone increases the average particle size by only up to 8 times. Particle size distribution and average particle size can be determined by dry-sieve or wet-sieve analysis or any other equivalent grain size analysis.

The method described herein also provides an increase in measures of viscosity that are used to characterize rheological properties, including but not limited to apparent viscosity, plastic viscosity, shear viscosity and complex viscosity. These viscosity parameters can be measured with a viscometer or a rheometer, or derived by calculations. As used herein, "apparent viscosity" or "AV" ($\eta_{app}$) refers to the value of viscosity measured and evaluated at a nominal average value of the shear rate. Per API requirements, a water-based drilling mud should have an apparent viscosity of at least 15 cP. In a preferred embodiment, the bentonite produced by the method described herein has an apparent viscosity of 12-230 cP, preferably 15-25 cP, more preferably 17-20 cP.

As used herein, "plastic viscosity" or "PV" ($\eta_{pl}$) is a parameter of the Bingham plastic model and represents the viscosity of a drilling mud when extrapolated to infinite shear rate on the basis of Bingham model. The bentonite product provided herein has a plastic viscosity of at least 5 cP, preferably 5-10 cP, more preferably 6-8 cP, and most preferably 6-7 cP. The Bingham model is expressed in the following equation:

$$\tau = \tau_0 + \eta_{pl}\gamma \quad \text{(Equation 1)}$$

Where $\tau$ is the measured shear stress at a shear rate of $\gamma$, $\tau_0$ is the yield stress or yield point, and $\eta_{pl}$ is the plastic viscosity.

As used herein, "yield point" (YP) is a critical shear stress point at which a material begins to deform plastically. The method described herein produces a bentonite with increased yield point, preferably in the range of 10-30 lb/100 ft$^2$, more preferably in the range of 20-30 lb/100 ft$^2$, and most preferably in the range of 25-30 lb/100 ft$^2$. In a particularly preferred embodiment, the product bentonite of the method has yield point of about 30 lb/100 ft$^2$. The maximum yield point per API specifications is 50 lb/100 ft$^2$.

In preferred embodiment, the bentonite produced by the method described herein has a viscometer dial reading of about 35 lb/100 ft$^2$ at 300 rpm and about 40 lb/100 ft$^2$ at 600 rpm. Per API requirements, these readings should be a minimum of 23 lb/100 ft$^2$ at 300 rpm and a minimum of 30 lb/100 ft$^2$ at 600 rpm.

The effects of continuous heating and stirring on the bentonite can also be demonstrated by the increase in water control or reduction in filtration loss, i.e. filtration or filtrate volume measured at the end (30 min) of an API filtration test (low-pressure, low-temperature or high-pressure, high-temperature). The filtrate volume of the product bentonite is further reduced by up to 50% when the method of the invention is accompanied by efficient and continuous heating and stirring compared to a product of a method without the heating and stirring. The method disclosed herein provides a sodium bentonite having a total filtration volume in the range of 12 to 20 mL, preferably in the range of 13 to 18 mL, more preferably in the range of 13 to 16 mL, and most preferably in the range of 14 to 15.

The Na-bentonite produced by the method of invention meets API 13A specification summarized in Table 1 for drilling grade bentonite. In a preferred embodiment of the invention, the sodium bentonite prepared by the method of the invention is used as a viscosifier to formulate drilling fluids; in particular water based drilling fluids. As used herein the terms "drilling fluids" and "drilling mud" have the same meaning and refer to a composition to aid in drilling operation to tap underground collections of oil and gas. As mentioned earlier, the main functions of the drilling fluids are to suspend and release cuttings, to assist in the removal of cuttings from the well, to seal off formations which may be encountered at different levels preventing the loss of drilling fluids to void spaces/porous formations, to lubricate the drilling tool, to control formation pressures, to assist formation fracking, to maintain the wellbore pressure and stability of the bore hole, to minimize formation damage, to transfer hydraulic energy to tools/bit, to ensure adequate formation evaluation (e.g., logging), and/or to facilitate cementing and completion. The drilling fluid compositions of the present disclosure can be advantageously formulated to possess rheological properties that enable their use in one or more of these applications depending on the specific needs of a drilling process. The drilling fluids herein are preferably useful for more than one of these applications, and thus, are considered to be multi-functional. The sodium bentonite prepared by the method of the invention is preferably employed in an amount in the range of 1 wt. % to 10 wt. %, preferably in the range of 2 wt. % to 9 wt. %, more preferably in the range of 3 wt. % to 8 wt. %, even more preferably in the range of 4 wt. % to 7 wt. %, and most preferably 5 wt. % to 6 wt. %, relative to a total weight of the drilling fluid composition, although amounts outside of these ranges may be used when drilling fluids having higher or lower viscosity are needed.

The drilling fluid may contain only water and sodium bentonite alone or in combination with other additives including other viscosifier such as, but not limited to, bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite and the like, as well as mixtures thereof. Natural polymers, such as xanthan gum (XC), psyllium husk powder (PHP), hydroxyethyl cellulose (HEC), carboxymethylcellulose, and polyanionic cellulose (PAC), as well as synthetic polymers, such as poly(diallyl amine), diallyl ketone, diallyl amine, styryl sulfonate, vinyl lactam, laponite, and polygorskites (e.g. attapulgite, sepiolite), including mixtures thereof, may also be used as viscosifiers.

In some embodiments, the drilling fluid composition optionally includes in addition to the sodium bentonite at least one additive selected from the group consisting of an antiscalant, a thickener, a deflocculant, a lubricant, a buffer, a biocide, and a weighting agent. The additive may be added to the drilling fluids composition in an amount of the total weight in the range of 0.01% to 10 wt. %, preferably in the range 0.1 wt. % to 8 wt. %, more preferably in the range of 1 wt. % to 8 wt. %, even more preferably 2 wt. % to 5 wt. %, and most preferably 2 wt. % to 3 wt. %, relative to the total weight of the drilling fluid composition.

The term "antiscalant" refers to any chemical agent that prevents, slows, minimizes, or stops the precipitation of scale such as, but not limited to calcium carbonate, calcium sulfate, barium sulfate, strontium sulfate, calcium phosphate, calcium fluoride, calcium silicate, magnesium hydroxide, zinc carbonate, and the like in the wellbore. For example, in the case of carbonate scale, antiscalants react with the carbonate to produce a metal oxide and carbon dioxide. Antiscalants which may be used in the present disclosure include inorganic phosphates (e.g., sodium hexametaphosphate, sodium tripolyphosphate, etc.), phosphonic acids (e.g., hydroxyethylidene diphosphonic acid, aminotris(methylenephosphonic acid) (ATMP)), organic monocarboxylic acids (e.g., lactic, acetic, acrylic, formic, glucuronic, stearic, gallic, palmitic, caffeic, glyoxylic, malic, and salicylic acid), polycarboxylic acids (e.g., butane-tricarboxylic acid, maleic acid, itaconic, fumaric, citric, oxalic, adipic, humic, sebacic, fulvic, and tartaric acid), phosphonates, sulfonic acids (e.g., vinyl sulfonic acid, allyl sulfonic acid, etc.), polycarboxylic acid polymers (e.g., polymers containing 3-allyloxy-2-hydroxy-propionic acid monomers), sulfonated polymers (e.g., vinyl monomers having a sulfonic acid group), and the like and mixtures thereof.

In some embodiments, a thickener is present in the drilling fluid composition. Exemplary thickeners include guar gum, glycol, polyanionic cellulose (PAC), starch, alginic acid (E400), sodium alginate (E401), potassium alginate (E402), ammonium alginate (E403), calcium alginate (E404), agar (E406), carrageenan (E407), locust bean gum (E410), pectin (E440), and Gelatin (E441) and mixtures thereof.

Also, a deflocculant may be incorporated into the drilling fluid composition. A deflocculant is a chemical additive used to prevent a colloid from coming out of suspension or to thin suspensions or slurries. One type of deflocculant is an anionic polyelectrolyte, such as acrylates (e.g., low molecular weight polyacrylic acids, ethyl acrylate-based polymers), polyphosphates, pyrophosphates (e.g., sodium acid pyrophosphate (SAPP)), polysulfates (e.g., sulfoethyl and/or sulfophenyl acrylamide-based polymers) lignosulfonates (Lig) or tannic acid derivates such as Quebracho.

The drilling fluid composition may also include a lubricant, such as oil, for lubrication. The lubricant may be synthetic oil or a bio-lubricant, such as those derived from plants and animals for example vegetable oils. Synthetic oils include, but are not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. bio-lubricants) that may be used in the present disclosure include canola oil, castor oil, palm oil, sunflower seed oil and rapeseed oil from vegetable sources, and Tall oil from tree sources, and the like.

The drilling fluid compositions of the present disclosure may also be formulated to include a buffer for adjusting and maintaining the pH of the drilling fluid and/or fluid located within the wellbore. The buffer used in the drilling fluid can be any buffer known in the art and has its maximum buffering capacity at the desired pH of the drilling fluids. Exemplary buffers include, but are not limited to phosphate buffer (buffering range pH 6.0 to 9.0), carbonate buffer (buffering range pH 8.0 to 10.0), acetate buffer (buffering range pH 5.0 to 6.0), glycine buffer (pH range 6.0 to 7.5), and the like.

A biocide may also be included in the drilling fluid formulations to kill or prevent bacterial or fungal growth in the drilling fluid and/or within the geological formation. Exemplary biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and 2-bromo-2-nitro-1,3-propane diol.

The drilling fluid composition may also include a weighting agent without adversely affecting its stability or other properties in order to maintain sufficient bottom hole pressure in the wellbore to prevent an influx of formation fluids. Exemplary weighting agents include calcium carbonate (chalk), barite, sodium sulfate, hematite, siderite, ilmenite, and combinations thereof.

The following examples are presented for illustrative purposes only and are not intended as limiting the scope of the invention which is defined by the appended claims.

Example 1

Materials

Figure 1B:
FIG. 1B is a map showing the location of Khulais area in Saudi Arabia where raw bentonite can be derived and converted into Na-bentonite.
Figure 3:
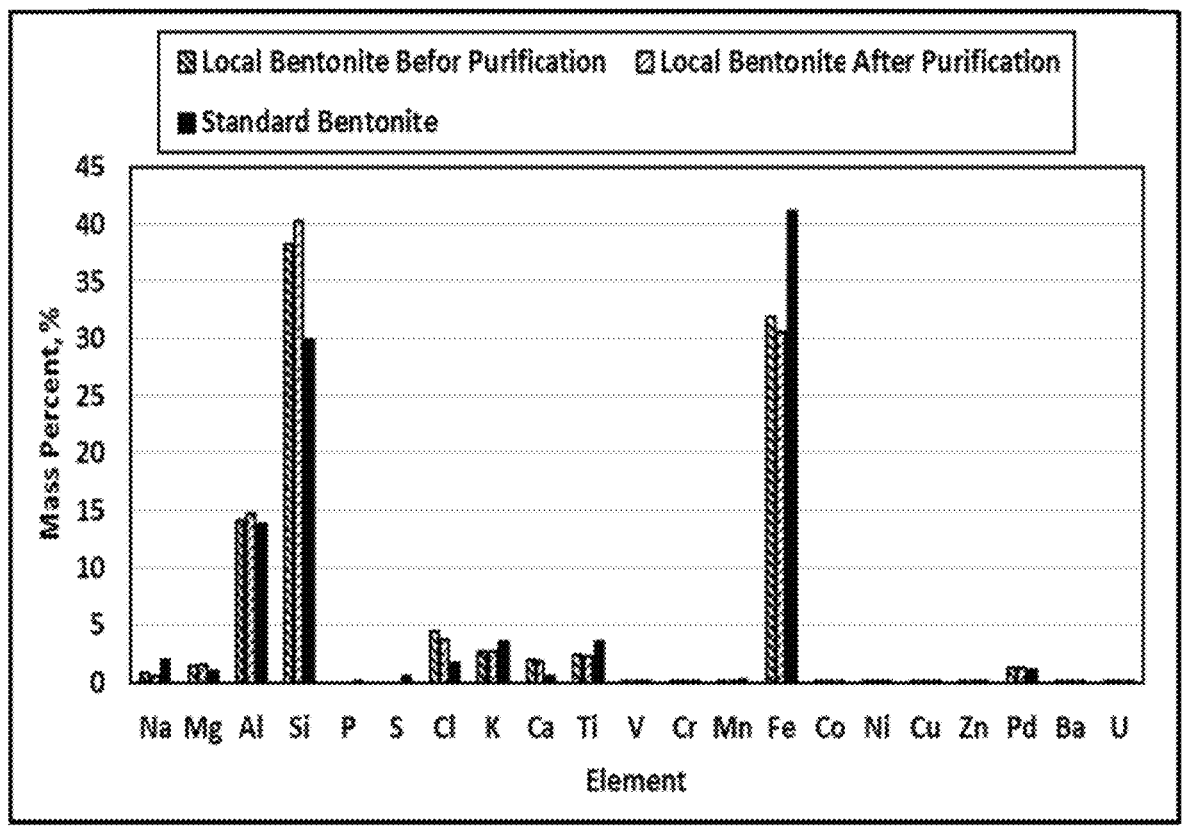
FIG. 3 shows the elemental composition of bentonite using XRF technique.

Local bentonite was collected from Khulais deposit that is located in the western area of Saudi Arabia obtained by mining process (FIG. 1). Bentonite rocks were crushed into small pieces then, grinded, sieved, and purified using sedimentation/sieving combined method (See FIGS. 2A and 2B). Local bentonite was characterized and compared with standard bentonite that obtained from a local supplier. FIG. 3 compares the elemental composition of local bentonite before and after purification with standard bentonite.

Sea water was used in this study for bentonite treatment. Since Khulais is close to the Red Sea, sea water was prepared using the same salts concentration of Red Sea water. Table 2 shows the salts concentrations of the seawater used in this study. Soda ash was used in the treatment to activate bentonite. Disodium salt of ethylenediaminetetra acetic acid ($Na_2$-EDTA, 40 wt. %) and sodium hydroxide were used to increase the pH.

TABLE 2

Red Sea water composition.

| Salt | Concentration, ppm |
|---|---|
| Sodium ($Na^+$) | 14255 |
| Calcium ($Ca2^+$) | 225 |
| Potassium ($K^+$) | 210 |
| Magnesium ($Mg^{+2}$) | 742 |
| Chloride ($Cl^-$) | 22219 |
| Bicarbonate ($HCO3^-$) | 146 |
| Sulfate ($SO4^{-2}$) | 3.078 |

Example 2

Methods (a) Bentonite Treatment

After bentonite was purified using sedimentation/sieving combined method, bentonite sample of 22.5 µm was added to 350 ml of sea water and mixed for 20 minutes in mud mixer to properly disperse bentonite powder, and sodium hydroxide was added to increase the pH to 9-10. Soda ash was added to the sea water with different ratios (0.5, 1, and 1.5 µm) to investigate the effect of soda ash on the properties of the treated bentonite. Then, the solution was left under heating and stirring at 100° C. and 400 RPM for 24 hours.

Afterwards, the solution was filtered to extract the treated bentonite and the treated bentonite was left in the oven for 4-6 hours to dry.

(b) Rheology Measurements

Different mud samples were prepared at room temperature by adding 22.5 μm of bentonite to 350 ml of distilled water while stirring in mud mixer for 20 minutes. Sodium hydroxide was added to increase the pH to 9-10. Then, the rheology was measured for all bentonite samples at room temperature using digital viscometer and the rheological properties were compared with the standard bentonite. Rheology measurements were taken immediately after preparation and after aging at room temperature for 16 hrs.

(c) LPLT Filtration Experiments

After aging the samples for 16 hours, the samples were put in mud mixer for 5 minutes then poured in the filtration cell to investigate the effect of the treatment on filtration performance of bentonite samples. The filtration experiments were performed at low pressure and room temperature using 2μ filter paper. A pressure of 100 psi was applied using nitrogen gas then, the experiments were started and the filtrate volume was recorded with time. the experiments were run for 30 minutes. Table 3 summarizes the filtration experiments conditions.

TABLE 3

Filtration experiments condition.

| Parameter | Description |
|---|---|
| Fluid volume | 350 cm$^3$ |
| Pressure | 100 psi |
| Temperature | Room |
| Experiment duration | 30 min |
| Filter paper | 2 μm |

Example 3

Results and Discussions

FIG. 3 compares the elemental composition of standard bentonite sample and local bentonite samples before and after purification determined by XRF. It shows that both the purified and unpurified local bentonite contains less sodium and more calcium than those of the standard sample. Thus, the local bentonite is considered a Ca-bentonite because of the low ratio of Na/Ca content.

Figure 4:
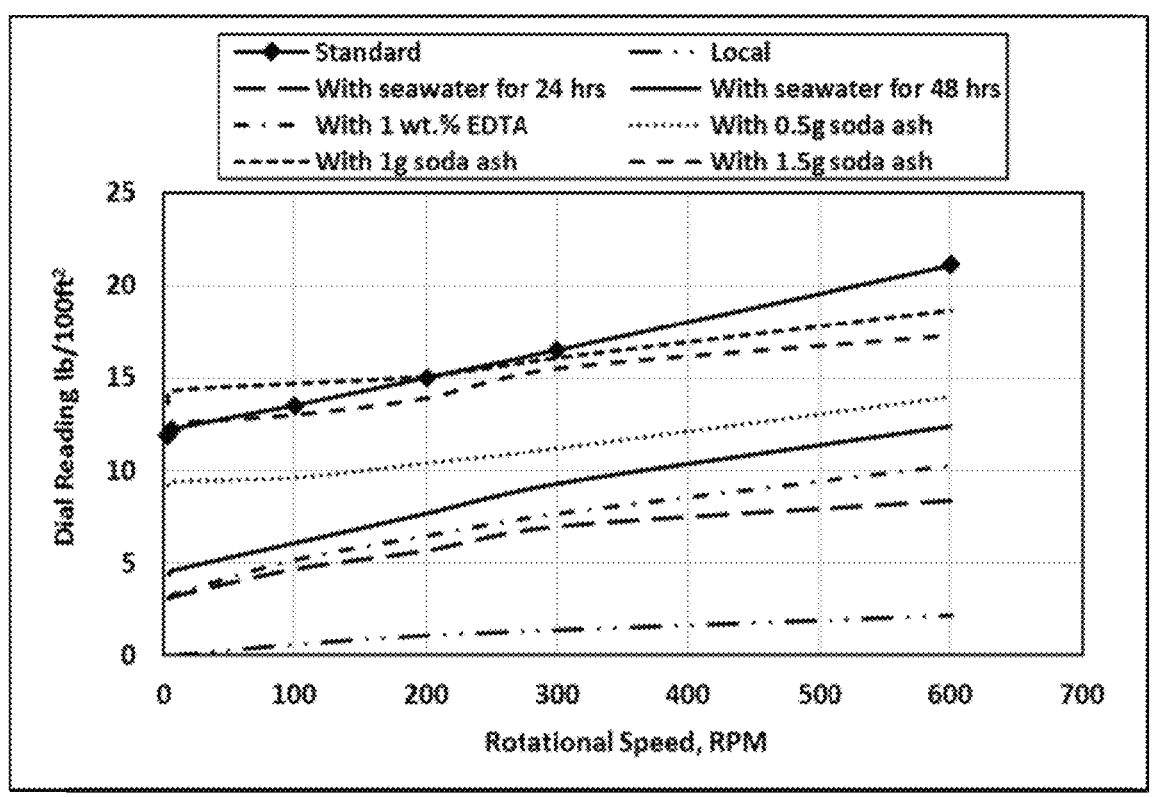
FIG. 4 shows the effect of the invention treatment on the rheology of bentonite samples measured immediately after mixing.
Figure 5:
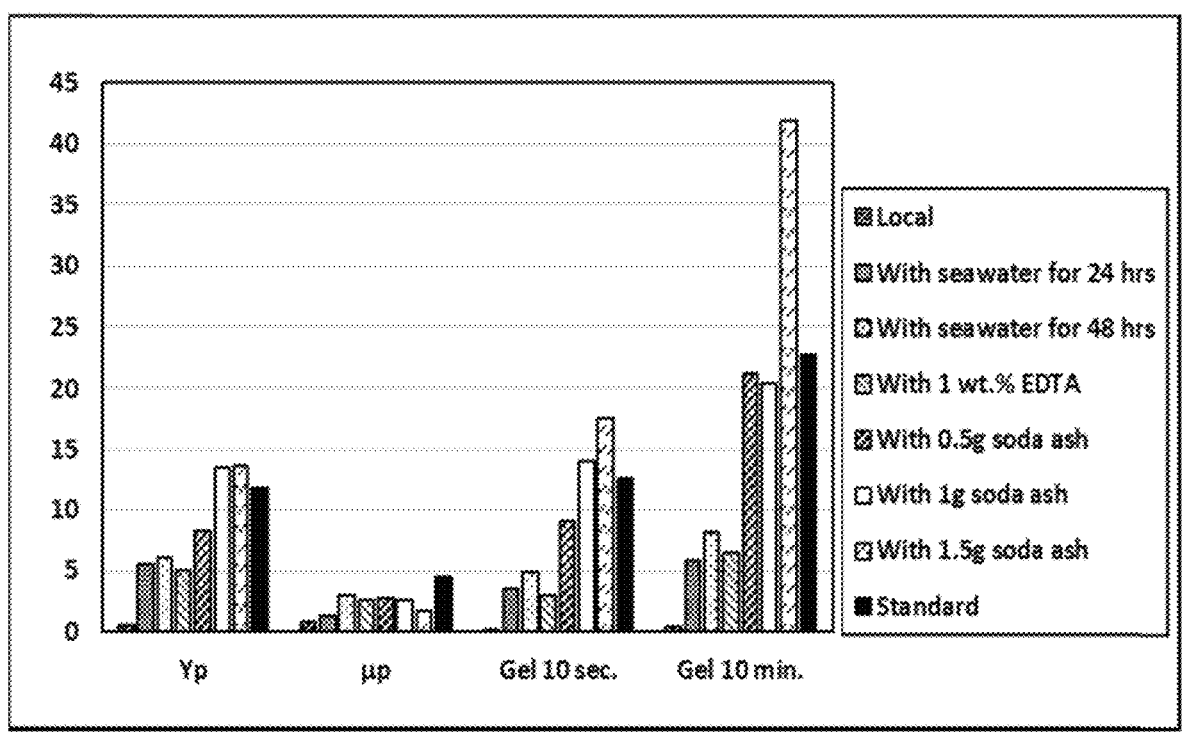
FIG. 5 shows the effect of the invention treatment on the rheological properties of bentonite samples measured immediately after mixing. The Y axis represents values of yield point (YP), Plastic Viscosity (PV), gel strength after 10 seconds (Gel 10 sec.), and gel strength after 10 minutes (Gel 10 min.).
Figure 6:
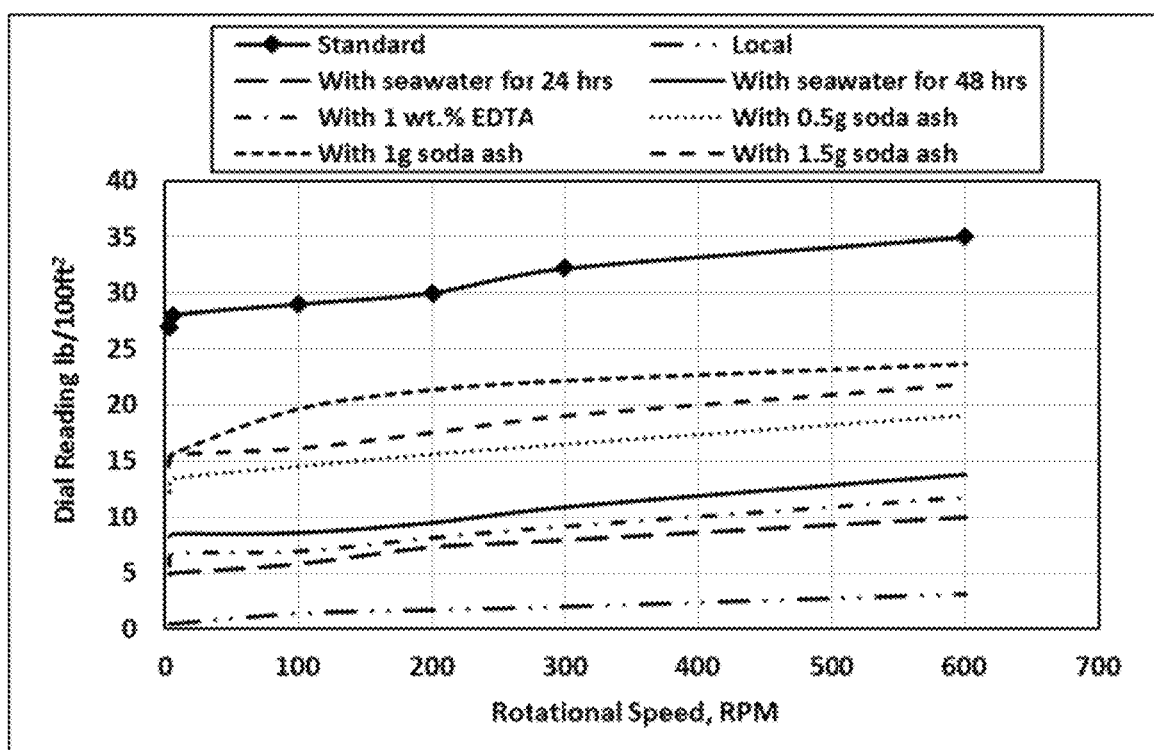
FIG. 6 shows a plot of stirring speed vs viscometer dial reading of bentonite samples. The sea water treated sample according to the method of the invention and aged for 16 hrs.
Figure 7:
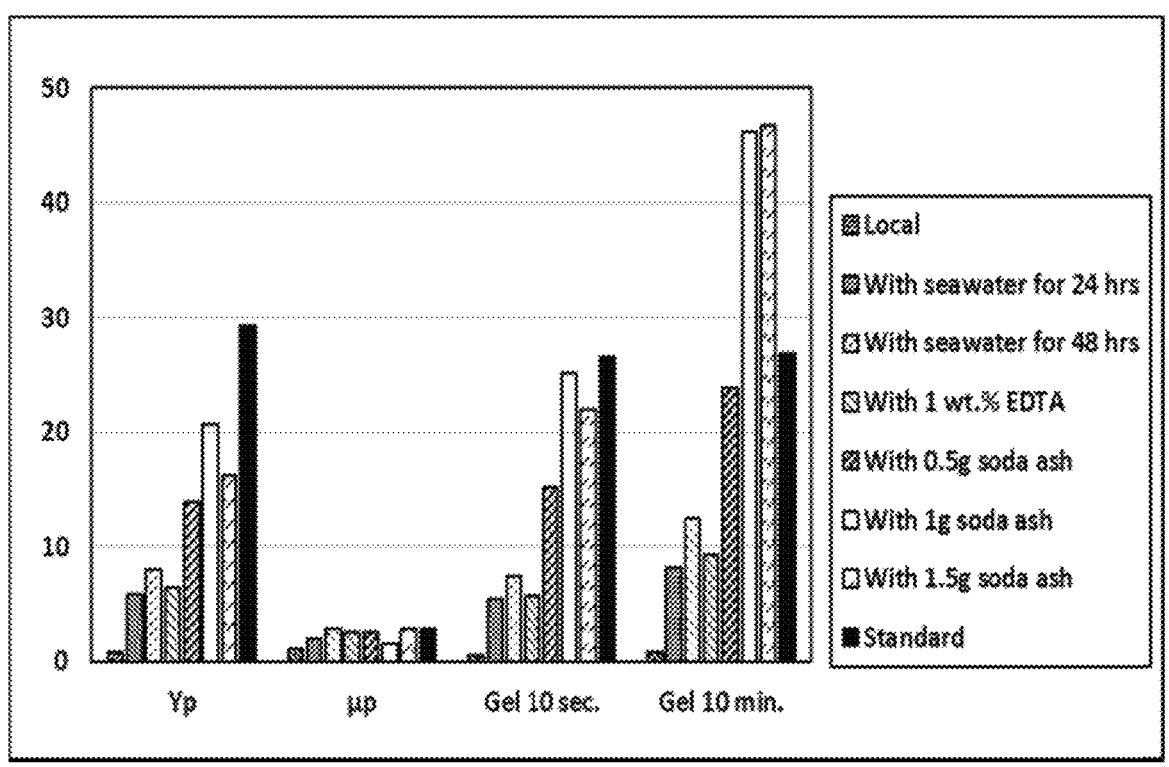
FIG. 7 shows the effect of the treatment on the rheological properties of bentonite samples measured after aging for 16 hrs. The Y axis represents values of yield point (YP), Plastic Viscosity (PV), gel strength after 10 seconds (Gel 10 sec.), and gel strength after 10 minutes (Gel 10 min.).

FIGS. 5 and 6 compare the rheological behavior of local calcium bentonite, treated, and standard sodium bentonite samples immediately after mixing and after aging for 16 hours at room temperature, respectively. A large difference rheological property between local bentonite and standard bentonite was observed. Local bentonite showed a poor swelling performance and the dial reading at 600 RPM was 2.5, whereas while standard bentonite displayed a reading of 21.1 under the same condition. Treating calcium bentonite with seawater only using NaOH and 1 wt. % EDTA, to increase the pH and improve the activation at 100° C. with stirring for 24 hours showed a slight improvement in the rheological behavior of Ca-bentonite. Increasing the time of the treatment with seawater to 48 hrs showed a further improvement in the rheological property, but further improvements was needed to meet the API specification for drilling grade bentonite. Adding soda ash to the seawater and bentonite solution under heating and stirring for 24 hours showed a significant improvement in the swelling and rheological performance and 1 μm of soda ash was found to be sufficient to produce bentonite having similar performance of standard bentonite (FIG. 4). Measuring yield point, plastic viscosity, and gel strength after 10 seconds and 10 minutes confirmed these results and the same performance was noticed for all the samples (FIGS. 5 and 7).

Figure 8:
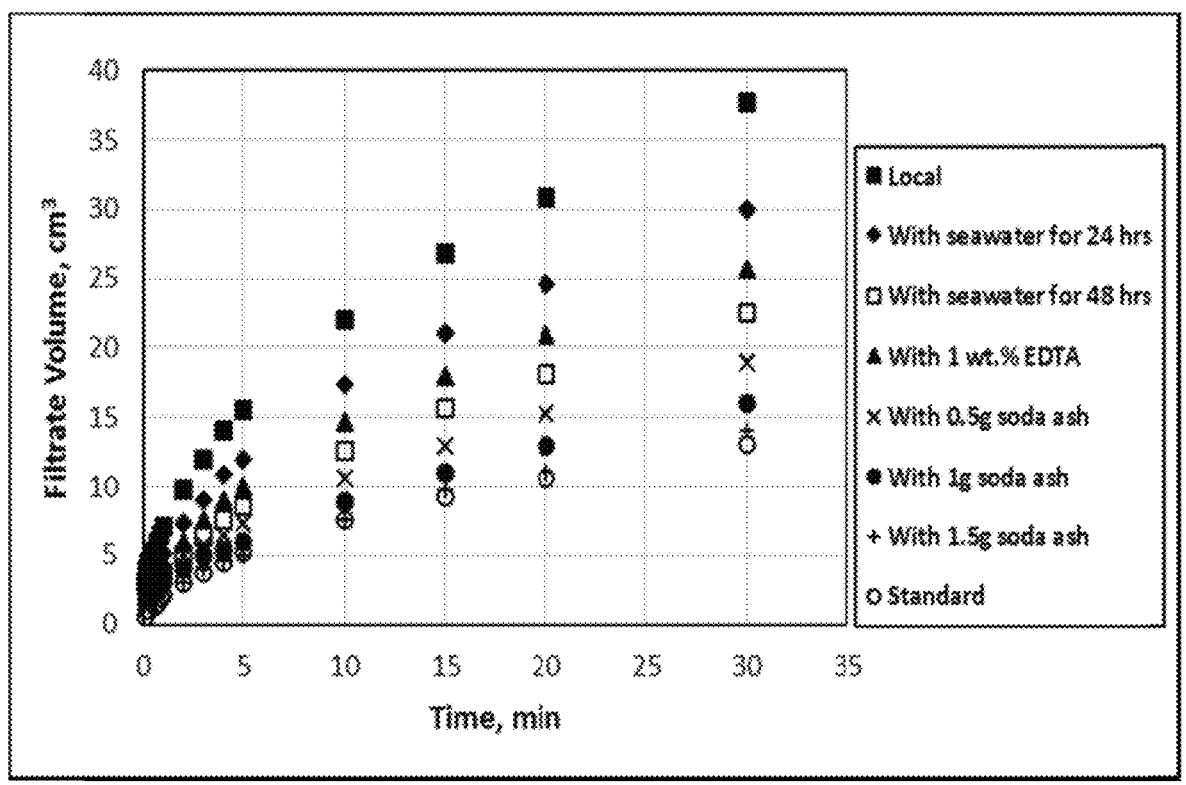
FIG. 8 shows the effect of the treatment on the filtration performance of bentonite samples.

FIG. 8 compares the filtration performance of local, treated, and standard sodium bentonite samples. The filtration experiments were performed at room temperature and a pressure of 100 psi for 30 minutes. Local bentonite showed poor filtration performance and the total filtrate volume was 37.7 cm$^3$ while it was 13.1 cm$^3$ for the standard sodium bentonite. Treating Ca-bentonite with seawater under heating and stirring for 24 hours with NaOH and 1 wt. % EDTA improved the filtration performance, and the filtrated volume was 30 and 25.7 cm$^3$, respectively. Increasing the time of the treatment with seawater to 48 hours showed a further improvement in filtration with a total filtrate volume of 22.5 cm$^3$. While, adding Soda ash in the treatment enhanced the filtration performance significantly and adding 1.5 μm of soda ash gave the same performance of standard sodium bentonite and the total filtrate volume was 14 cm$^3$.

The invention claimed is:

1. A method of producing sodium bentonite having a Na/Ca molar ratio of at least 2.5, comprising:
    mixing calcium bentonite with sea water to form a calcium bentonite suspension at final calcium bentonite concentration in a range of 2 wt. % to 15 wt. % of the total weight of the sea water,
    adjusting the pH of the calcium bentonite suspension in a range of 8.0 to 11 to form an alkaline suspension,
    heating the alkaline suspension to a temperature in a range of 80 to 100° C. with stirring for a time in a range of 12 to 72 hours to form a sodium bentonite suspension, and
    filtering the sodium bentonite suspension to isolate the sodium bentonite, and
    oven drying the sodium bentonite.

2. The method of claim 1, wherein the sea water is from the Red Sea, Arabian Gulf, Mediterranean Sea, or sea water outflow from sea water desalination plant.

3. The method of claim 1, wherein the sea water contains at least 12000 ppm sodium ion.

4. The method of claim 1, further comprising adding sodium carbonate.

5. The method of claim 4, further comprising
    stirring the calcium bentonite suspension for a time in a range of 10 to 30 minutes prior to adding the sodium carbonate.

6. The method of claim 4, wherein the sodium carbonate and the calcium bentonite are in a ratio in a range of 1:11 to 1:45 by weight.

7. The method of claim 1, wherein the pH is in a range of 9.0 to 10.0.

8. The method of claim 1, wherein the alkaline suspension is heated to about 100° C.

9. The method of claim 8, wherein the alkaline suspension is heated continuously for a time in the range 24 hours to 48 hours.

10. The method of claim 8, wherein the alkaline suspension is stirred at a rate in a range of 300 to 600 RPM.

11. The method of claim 1, wherein ethylenediaminetetracetate (EDTA) is added.

12. The method of claim 1, wherein sodium hydroxide is added to increase the pH of the calcium bentonite suspension.

13. The method of claim 1, wherein the Ca-bentonite has been purified by at least one method selected from the group consisting of dry-sieving, wet-sieving, dispersion in deionized water with hexametaphosphate, dispersion in deionized water without hexametaphosphate and sedimentation.

14. The method of claim 1, wherein after the oven drying the sodium bentonite has a Na/Ca molar ratio in a range of 2.5-3.0.

15. A method of preparing a drilling fluid comprising sodium bentonite having a Na/Ca molar ratio of at least 2.5, comprising:
- mixing calcium bentonite with sea water to form a suspension at final bentonite concentration in a range of 2 wt. % to 15 wt. % of the total weight of the sea water,
- adjusting the pH of the suspension in a range of 8.0 to 11,
- heating the suspension to a temperature in a range of 80 to 100° C. with stirring for a time in a range of 12 to 72 hours to form a sodium bentonite suspension,
- filtering the sodium bentonite suspension to isolate the sodium bentonite, and
- oven drying the sodium bentonite, and
- mixing the sodium bentonite with water in an amount in a range of 1 wt. % to 10 wt. % to form the drilling fluid.

16. The method of claim 15, further comprising
- mixing one or more additive selected from the group consisting of an antiscalant, a thickener, a deflocculant, a lubricant, a buffer, a biocide, and a weighting agent with the drilling fluid.

* * * * *